United States Patent
Valadon

(10) Patent No.: US 7,644,346 B2
(45) Date of Patent: Jan. 5, 2010

(54) FORMAT DETECTION

(75) Inventor: Cyril Valadon, Letchworth (GB)

(73) Assignees: MStar Semiconductor, Inc., Cayman Islands (KY); MStar Software R&D, Ltd., Shenzhen (CN); Mstar France SAS, Issy les Moulineaux (FR); MStar Semiconductor, Inc. (TW)

( * ) Notice: Subject to any disclaimer, the term of this patent is extended or adjusted under 35 U.S.C. 154(b) by 563 days.

(21) Appl. No.: 10/534,359

(22) PCT Filed: Nov. 7, 2003

(86) PCT No.: PCT/GB03/04819

§ 371 (c)(1),
(2), (4) Date: Nov. 4, 2005

(87) PCT Pub. No.: WO2004/042990

PCT Pub. Date: May 21, 2004

(65) Prior Publication Data

US 2006/0146963 A1    Jul. 6, 2006

(30) Foreign Application Priority Data

Nov. 7, 2002    (GB) ................................. 0226004.0

(51) Int. Cl.
*H03M 13/03* (2006.01)
(52) U.S. Cl. .................. 714/795; 714/796; 714/794; 714/790; 375/341
(58) Field of Classification Search ................... 714/795
See application file for complete search history.

(56) References Cited

U.S. PATENT DOCUMENTS 6,694,474 B2 * 2/2004 Ramprashad et al. ....... 714/755
6,829,313 B1 * 12/2004 Xu ............................. 375/341

(Continued)

FOREIGN PATENT DOCUMENTS

EP     1 187 343 A2    3/2002

(Continued)

OTHER PUBLICATIONS

Richard V. Cox and Carl-Erik W. Sundberg, An Efficient Adaptive Circular Viterbi Algorithm for Decoding Generalized Tailbiting Convolutional Codes, 1994, IEEE, vol. 43, p. 59-61.*

(Continued)

*Primary Examiner*—M. Mujtaba K Chaundry
*Assistant Examiner*—Enam Ahmed
(74) *Attorney, Agent, or Firm*—Edell, Shapiro & Finnan, LLC

(57) ABSTRACT

A method of assessing an encoded signal to determine whether a candidate format was used to arrange the signal into blocks before the encoding was done, the method comprising: using the Viterbi algorithm to determine trellis metrics for a point in said signal that would be an end point of a candidate block according to the candidate format; determining from said metrics the likelihood of occupation at said point of an end state of an encoding scheme used to create the encoded signal; decoding a part of said signal ending at said point; and performing a check using said decoded part to determine whether the candidate block satisfies an error protection scheme of the candidate format.

17 Claims, 4 Drawing Sheets

U.S. PATENT DOCUMENTS

| | | | |
|---|---|---|---|
| 6,917,629 B1 * | 7/2005 | Ramesh et al. | 370/509 |
| 7,072,926 B2 * | 7/2006 | Nagata et al. | 708/277 |
| 2002/0051505 A1 * | 5/2002 | Kuwazoe | 375/341 |

FOREIGN PATENT DOCUMENTS

| | | |
|---|---|---|
| EP | 1 370 006 A2 | 12/2003 |
| EP | 1 387 516 A1 | 2/2004 |
| GB | 2 366 167 A | 2/2002 |
| WO | WO 02/060083 A2 | 8/2002 |

OTHER PUBLICATIONS

Richard V. Cox and Carl-Erik W. Sundberg, An Efficient Adaptive Circular Viterbi Algorithm for Decoding Generalized Tailbiting U Convolutional Codes, 1994, IEEE, vol. 43, p. 59-61.*

Insoo Sohn; Seoyoung Lee, Blind Rate Detection Algorithm in WCDMA Mobile Receiver, 2001, IEEE, pp. 1590-1591.*

Ahmed, "Block-Size Estimation and Application to BTFD for 3GPP UMTS", Globecom '01 IEEE, vol. 5, pp. 3045-3049, (2001).

Ahmed, "Maximum-Likelihood Block-Size Detection for MPSK Signaling", Vehicular Technology, IEEE Transaction, vol. 51, Issue 3, pp. 511-525, (May 2002).

Sohn, et al., "Blind Rate Detection Algorithm in WCDMA Mobile Receiver", Vehicular Technology conference, 2001. VTC 2001, Fall. IEEE VTS $54^{th}$, vol. 3, pp. 1589-1592, (2001).

Black et al., A 1-Gb/s, Four-State, Sliding Block Viterbi Decoder, IEEE Journal of Solid-State Circuits, vol. 32, No. 6, Jun. 1997, pp. 797-805.

* cited by examiner

FORMAT DETECTION

CROSS REFERENCE TO RELATED APPLICATIONS

This application is an national phase application based on PCT/GB2003/004819, filed Nov. 7, 2003, and claims the right to priority based on Great Britain Application No. 0226004.0, filed Nov. 7, 2002, the content both of which is incorporated herein by reference.

The invention relates to methods of, and apparatus for, determining which of a group of formats has been applied to an encoded signal that is capable of being decoded using the Viterbi algorithm. The Viterbi algorithm can be used to decode signals that have been encoded using, for example, a convolutional encoding scheme (recursive or non-recursive), a trellis code modulation (TCM) scheme or a multi-level coded modulation (MCM) scheme.

One of the major applications of the Viterbi algorithm is in the Universal Mobile Telecommunications System (UMTS) to decode signals that have been encoded to protect transmitted bits against errors.

In UMTS, a signal to be transmitted, comprising a stream of data bits, is formatted according to a transport format selected from amongst a group of available transport formats defined under the UMTS standard. When a signal is to be transmitted, it is transmitted as a series of blocks, each block being formatted in accordance with the selected transport format. Each transport format will accommodate a number of bits of the signal to be transmitted plus, amongst other things, a certain number of error checking bits. The identity of the transport format being employed may or may not be signalled to a unit receiving a transmitted signal. If no indication of the transport format is supplied to a unit receiving a transmitted signal, then the unit must determine the employed format itself in order to correctly decode the received signal.

One object of the invention is to provide a useful way of determining the format of a received communication signal, when said format is not explicitly signalled.

According to one aspect, the invention provides a method of assessing an encoded signal to determine whether a candidate format was used to arrange the signal into blocks before the encoding was done, the method comprising: using the Viterbi algorithm to determine trellis metrics for a point in said signal that would be an end point of a candidate block according to the candidate format; determining from said metrics the likelihood of occupation at said point of a termination state of an encoding scheme used to create the encoded signal; decoding a part of said signal ending at said point; and performing a check using said decoded part to determine whether the candidate block satisfies an error protection scheme of the candidate format.

The invention also consists in apparatus for assessing an encoded signal to determine whether a candidate format was used to arrange the signal into blocks before the encoding was done, the apparatus comprising: calculating means applying the Viterbi algorithm to determine trellis metrics for a point in said signal that would be an end point of a candidate block according to the candidate format; assessing means for determining from said metrics the likelihood of occupation at said point of a termination state of an encoding scheme used to create the encoded signal; decoding means for decoding a part of said signal ending at said point; and checking means for performing a check using said decoded part to determine whether the candidate block satisfies an error protection scheme of the candidate format.

Thus, the invention provides a way of determining if a candidate format has been applied to an encoded signal.

In one embodiment, the determination of the likelihood of occupation of the termination state comprises comparing the metrics for the Viterbi trellis stage representing the candidate end point. Preferably, the likelihood of occupation is determined by way of comparing the maximum metric at the trellis stage representing the end point with the termination state metric at the same trellis stage. For example, the comparison of the maximum metric and the termination state metric can be carried out by normalising the termination state metric and the maximum metric relative to the minimum metric at the Viterbi trellis stage representing the end point specified by the candidate format, and then comparing the normalised maximum metric to a quantity formed by multiplying the normalised termination state metric by a factor.

In one embodiment, the decoding of a part of the encoded signal finishing at the candidate end point is carried out only if there is sufficient likelihood of occupation of the encoding scheme's termination state at the candidate end point. In another embodiment, the decoding operation proceeds irrespective of the assessed likelihood of termination state occupation.

The invention involves checking to determine if a candidate block satisfies an error protection scheme used by the candidate format. In one embodiment, the candidate format comprises a data part and a checksum and the checking operation involves generating a corroborative checksum from the data part of the candidate block and also involves a comparison of the corroborative checksum with the checksum part of the candidate block. Preferably, the checksums are cyclic redundancy checksums, known as a CRCs.

In a preferred embodiment where the candidate block is expected to conform to a candidate format comprising a data part and a checksum part containing a checksum established on the data part, the extent of the decoded part of the encoded signal has an effect on how the check is done to determine whether the candidate block satisfies the error protection scheme of the candidate format. Where the decoded part contains the entirety of what should be the data part of the candidate block according to the candidate format, then a corroborative checksum is generated from the data part of the candidate block that is provided by the decoded part and the corroborative checksum is compared with the checksum part of the candidate block. Where the decoded part of the signal contains a portion only of the data part of the candidate block then a corroborative checksum is generated from the decoded portion of the data part using an intermediate checksum value as a starting point. The intermediate checksum value may be, for example, a value obtained by generating a checksum on the basis of a part of the encoded signal that was decoded at an earlier time in an assessment of whether another candidate format was the true format being used for the signal.

Amongst other things, the invention extends to format detection of received signals in basestations and subscriber units of wireless telecommunications networks.

By way of example only, some embodiments of the invention will now be described with reference to the accompanying figures, in which.

Figure 1:
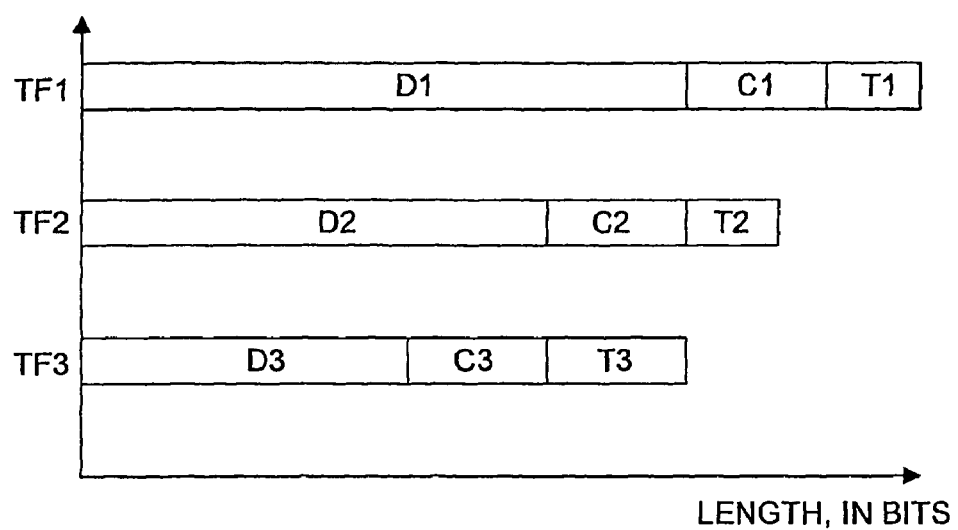
FIG. 1 illustrates, schematically, a number of UMTS transport formats.

In a UMTS network, a transmitted signal is arranged according to a transport format selected from a group of predetermined transport formats. FIG. 1 illustrates, schematically, three transport formats TF1, TF2 and TF3. Each transport format comprises a block of data bits D1, D2, D3, some tail bits T1, T2, T3 and a cyclic redundancy checksum (CRC) C1, C2, C3 established on the respective data block. The (main) difference between the transport formats is in the lengths of the data blocks D1, D2, D3. The data in the data blocks is not necessarily just information bits that can be used directly by a receiver. For example, a data block might comprise a mixture of control bits and encoded information.

A signal to be transmitted is formatted in accordance with the selected transport format. Sufficient bits are taken from the signal to be transmitted to fill the data block of the selected transport format. A CRC is then generated on the data block. The CRC is attached to an end of the data block to produce, with an appropriate number of tail bits, a composite block which then undergoes convolutional encoding and is transmitted. The convolutional encoding scheme employed is "terminated", i.e. the encoding scheme commences operation in the all zero state and concludes encoding the composite block by returning to the all zero state. The all zero state is termed the "termination state". The tail bits, which are all set to state zero, are provided to achieve the termination. Of course, if the termination state of the encoding scheme were something other than the all zero state, then the tail bits would follow a different pattern. If there are further bits of the signal awaiting transmission, then these are used to produce further convolutionally encoded composite blocks, with the process repeating as often as is necessary to transmit all of the data that is required to be sent.

The process of determining the transport format of a received signal transmitted in such a manner will now be discussed with reference to FIG. 2, which shows a mobile telephone 10 and provides a schematic illustration of the processes involved in transport format detection. Signals arriving at the antenna 12 of the mobile telephone 10 are processed (indicated at 14) to recover the received signal in the form of a stream of soft decisions. The soft decisions are supplied to a Viterbi decoder 16 which undoes the effect of the convolutional encoding performed by the transmitter which supplied the received signal.

The Viterbi decoder 16 decodes the received signal by using a trellis having a number of stages, each stage corresponding to the arrival of a number of soft decisions (dependent upon the rate of the encoder used on the signal being received) and comprehending a group of possible states that the Viterbi decoder can assume. At each stage of the trellis, a metric is calculated for each of the possible states. The metrics are then used to make decisions on the most likely transitions between states in neighbouring stages of the trellis. The decisions are recorded in a decision history 18.

The telephone 10 is provided with information specifying the transport formats that could have been applied to the received signal when it was prepared for transmission to the telephone 10. The telephone 10 initially chooses the smallest transport format to be a candidate transport format for testing against the received signal.

When the metrics for the stage of the trellis that would be the end stage if a composite block had been sent using the candidate format are produced by the Viterbi decoder 16, they are supplied to a metric test until 20 which analyses the metrics to assess the likelihood that the all zero state is the state that is occupied at this stage of the trellis. The all zero state is the termination state of the convolutional encoding scheme being employed, so occupancy of the all zero state potentially indicates that the end of a transmitted composite block has been reached. The test performed by the metric test unit 20 is:

$$(M_0 - M_{min}) > 0.625(M_{max} - M_{min})$$

$M_0$ is the metric of the all zero state at the candidate end stage of the trellis.

$M_{max}$ is the largest metric at the candidate end stage of the trellis.

$M_{min}$ is the smallest metric at the candidate end stage of the trellis.

Of course, factors other than 0.625 could be used and such factors could be determined on the basis of simulation.

If the condition specified above is satisfied by the metrics of the candidate end stage of the trellis, a trace-back is performed through the decision history 18 starting at the all zero state of the candidate end stage. The path that is followed through the decision history yields a Viterbi-decoded candidate block of the received signal. The candidate block then needs to be tested to determine if it concurs with the error protection scheme of the candidate transport format. This test is performed at CRC test unit 22.

At CRC test unit 22, the candidate block is divided into a data block and a CRC in accordance with the candidate transport format. The data block portion of the candidate block is then passed through a CRC generation process in the CRC test unit 20. If the CRC produced by the data block portion of the candidate block agrees with the CRC portion of the candidate block then the candidate transport format is recorded as the true transport format in a transport format indication 24.

If the CRC derived from the data block of the candidate block does not agree with the CRC portion of the candidate block, then the candidate transport format is determined to be incorrect. In this case, the transport format that is the next largest in the group of possible transport formats becomes the new candidate transport format and the Viterbi decoder then continues processing the trellis, accumulating further decisions in the decision history 18.

Once the Viterbi decoder 16 has processed the trellis stage corresponding to the end position of a candidate block arranged according to the new candidate transport format, the metrics for that stage are supplied to the metric test unit 20. If the metrics of this stage pass the test condition, then a trace-back is performed through the decision history to generate a new candidate block for assessment by the CRC test unit 20.

Thus, as the Viterbi decoder continues to process the stages of the trellis, the end positions of the possible transport formats are tested in turn, beginning with the smallest candidate format and ending, if the true format is not identified along the way, with the largest candidate format.

It is not an absolute requirement that candidate formats are tested in the particular order of smallest to largest, although adopting this order allows another embodiment of the invention to operate in an efficient manner, as will now be described.

Figure 2:
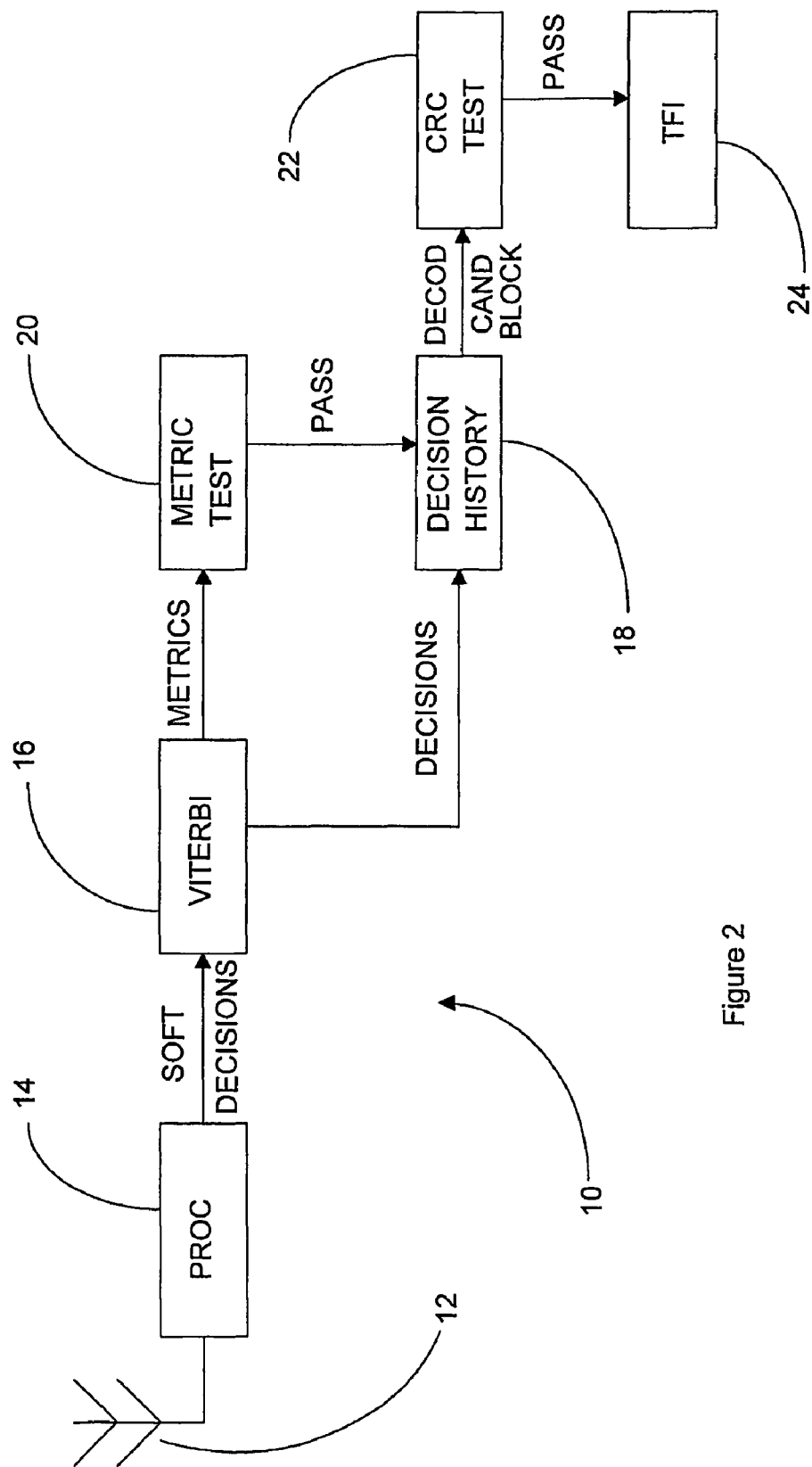
FIG. 2 illustrates, schematically, a mobile telephone, showing primarily the processes involved in transport format detection.
Figure 3:
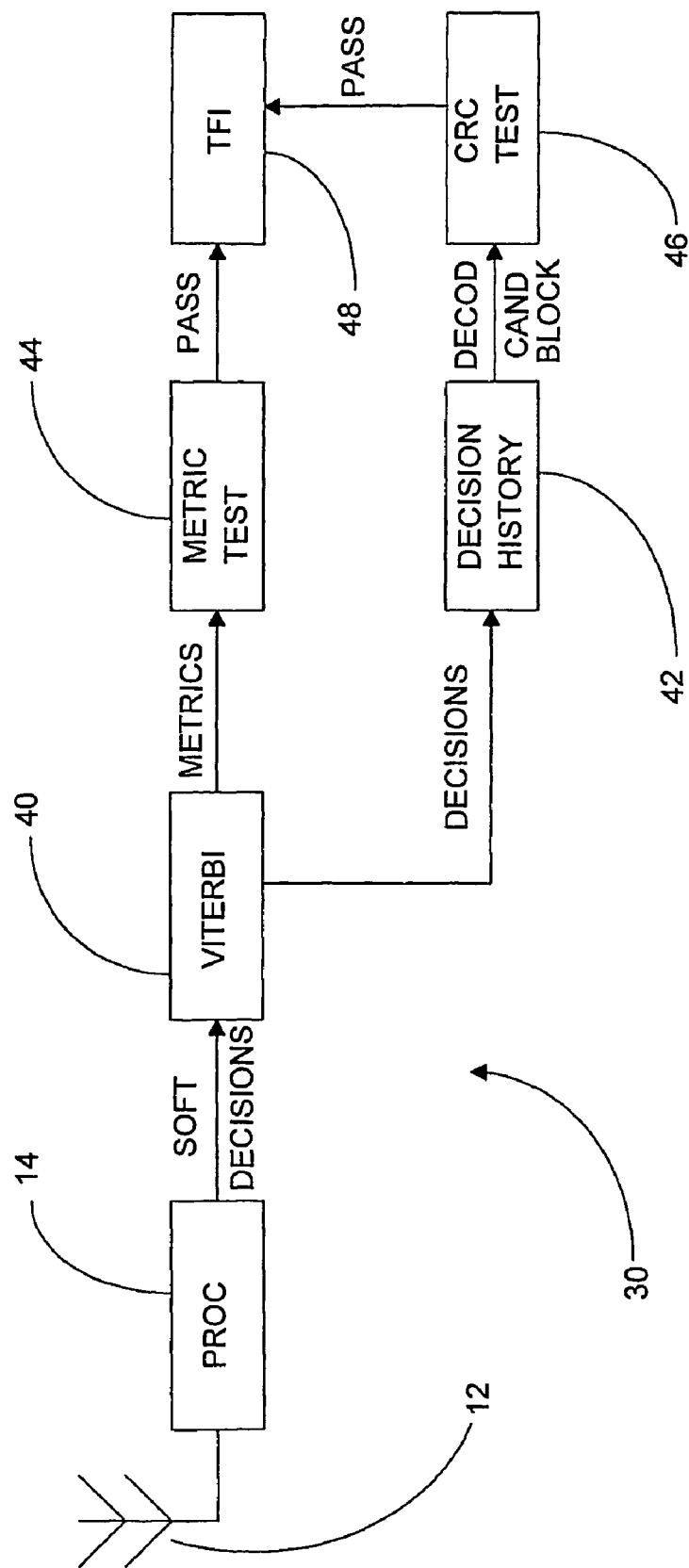
FIG. 3 illustrates, schematically, an alternative arrangement for performing transport format detection within a mobile telephone.

FIG. 3 shows another embodiment of a transport format detection scheme within a mobile telephone 30. In FIG. 3, elements carried over from FIG. 2 retain the same reference numerals and will not be described again in detail. The system shown in FIG. 3 includes a Viterbi decoder 40, a decision history 42, a metric test unit 44 and a CRC test unit 46. Whilst these elements fulfil similar functions to the corresponding elements in FIG. 2, the order of the operations that are performed using these elements is different in FIG. 3 and operation of these elements will now be described in more detail.

Figure 4:
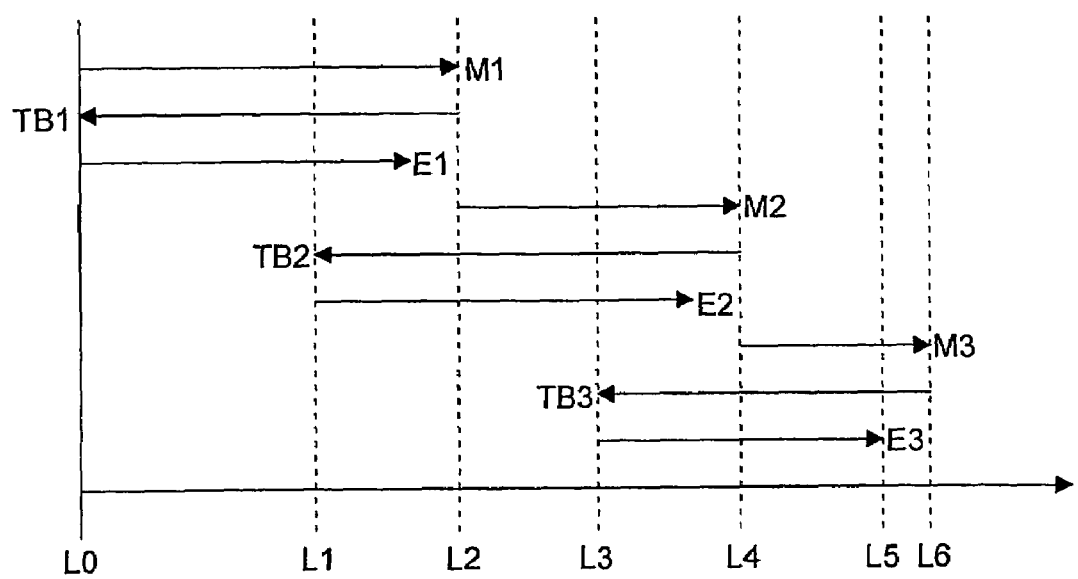
FIG. 4 illustrates, schematically, the operations performed by the arrangement shown in FIG. 3.

FIG. 4 illustrates a situation where a signal to be decoded has one of three possible transport formats, each of the general type indicated in FIG. 1. FIG. 4 depicts the soft decisions of the received signal along the X axis. Position L0 denotes the start of the next block to be decoded. The positions L2, L4 and L6 denote the possible end positions of the next block to be decoded. Position L2 denotes the end position of a candidate block for the shortest of the three possible transport formats. Position L4 denotes the end of a candidate block conforming to the intermediate one of the three transport formats. Position L6 denotes the end position of a candidate block conforming to the longest of the three transport formats. As mentioned above, this embodiment assesses the candidate formats in order of smallest to largest, i.e. a candidate block of length L2 is processed first, then a candidate block having length LA is processed and finally a candidate block having length L6 is processed.

The first candidate format to be assessed is the one which would result in a candidate block extending from L0 to L2 and is hereinafter called the L2 format.

The Viterbi decoder 40 processes the soft decisions from position L0 to position L2 as indicated by arrow M1. The decisions that the Viterbi decoder 40 makes in moving between the stages of the trellis representing the received signal are stored in decision history 42. Once the Viterbi decoder 40 has produced metrics for the trellis stage corresponding to position L2 within the received signal, the metric test unit 44 performs the same test as used by metric test unit 20 in FIG. 2 in order to determine the likelihood that the all zero state is the state that is occupied at the trellis stage corresponding to position L2. Once the trellis decoder 40 has processed the signal up to the point L2, a trace back is performed through the decision history 42, commencing with the all zero state at the trellis stage for position L2. The trace back step is indicated by arrow TB1 in FIG. 4.

The decoded candidate block produced by the trace back step is then supplied to CRC test unit 46. The CRC test unit 46 uses the data block of the decoded candidate block in order to generate a CRC which is compared with the section of the decoded candidate block which is a CRC according to the candidate transport format. The process of generating a CRC on the basis of the data portion of the decoded candidate block is indicated by arrow E1 in FIG. 4. It will be noticed that arrow E1 does not reach position L2 in the received signal. This is because the data block of the decoded candidate block ends before position L2 is reached, due to the inclusion of a CRC and tail bits in the candidate transport format. During the CRC generation process indicated by arrow E1, the CRC code that has been generated upon reaching position L1 within the received signal is stored for future use as will be explained later. If the CRC now generated from the data block of the decoded candidate block matches the CRC contained in the decoded candidate block, then the candidate block is deemed to pass the CRC test.

If the L2 format passes the tests performed by metric test unit 44 and CRC test unit 46 then the L2 format is recorded as the true transport format in transport format indication 48. If the L2 format fails one or both of the metric and CRC tests, then the system proceeds to assess whether the second candidate transport format is the correct one. The second candidate transport format is the format which would result in a candidate block extending from position L0 to position L4 and is hereinafter called the L4 format.

To begin assessing the L4 format, the content of the decision history 42 relating to the part of the signal extending between L0 and L1 is relinquished and the metrics for the trellis stages corresponding to the portion of the signal extending from position L2 to position L4 are produced by the Viterbi decoder 40 as indicated by arrow M2. The decisions made by the Viterbi decoder 40 in moving from stage to stage within the trellis are logged in decision history 42. Upon production of metric values for the trellis stage corresponding to position L4, the metric test unit 44 can perform its test on the metrics for the trellis stage corresponding to position L4 and a trace back can be performed through the decision history 42 as indicated by arrow TB2. The trace back commences from the all-zero state of the trellis stage corresponding to position L4. It will be noted that the decision history 42 only contains data for the section of the signal extending from L4 to L1 so the trace back is performed only as far as position L1, which is the point at which the CRC code was stored in the CRC test performed during the assessment of the L2 format.

This stored CRC code is now retrieved by CRC test unit 46 and is used as a starting value for performing the CRC test on the candidate block extending from L0 to L4. Only the latter part of the data block of this candidate block was recovered during the TB2 trace back process and this section of the data block is now applied to the retrieved CRC code value in a CRC generation process to evolve a final CRC code value for the entire data block of the candidate block conforming to L4 format. The process of generating the final CRC code value is indicated by arrow E2 in FIG. 4. Arrow E2 does not reach position L4 because the data block portion of the candidate block does not finish at the end of the candidate block due to the presence of a CRC code and tail bits at the end of the candidate block. During the CRC generation process indicated by arrow E2, the value of the CRC code generated upon reaching position L3 is saved for future use. The CRC value produced at the end of the process indicated by arrow E2 is compared by the CRC test unit 46 with the CRC contained in the decoded candidate block. If these CRC values agree, then the decoded candidate block is considered to pass the CRC test.

If the L4 format passes the test conducted by metric test unit 44 and the CRC test conducted by unit 46, then the candidate transport format is recorded as the true transport format in the transport format indication 48. If the L4 candidate block fails one or both of the tests performed by the metric test unit 44 and the CRC test unit 46, then the system moves on to test the largest of the three available transport formats. The largest candidate format is the one which would result in a candidate block extending from position L0 to position L6 and is hereinafter called the L6 format.

To assess the L6 format, the content of the decision history 42 relating to the part of the signal extending between L1 and L3 is purged and the Viterbi decoder 40 then proceeds to calculate metrics for the trellis stages extending from position L4 within the received signal to position L6, as indicated by arrow M3. The decisions made by the Viterbi decoder 40 in moving from stage to stage within the trellis are recorded in the decision history 42. Once the metrics of the trellis stage corresponding to position L6 have been calculated, the metric test unit 44 can assess the metrics of that stage and a trace back can be performed through the decision history 42 as indicated by arrow TB3. The trace back is performed from the all zero state of the trellis stage corresponding to position L6. It will be noted that the decision history 42 only contains data for the section of the signal extending from L6 to L3 so the trace back TB3 is only performed as far as position L3.

The metric test unit 44 assesses whether the metrics for the trellis stage corresponding to position L6 satisfy the inequality mentioned earlier. If the metrics satisfy the inequality then the metrics of the L6 stage are judged to have passed the metric test and the all zero state of the trellis stage at position L6 is considered the state that is likely to be occupied.

The CRC test unit 46 uses the information decoded during the trace back process indicated by TB3 to perform a CRC test on the L6 candidate block. At the start of the CRC test, the CRC test unit 46 retrieves the CRC code value that was stored for position L3 during the CRC test performed on the LA candidate block. The retrieved CRC value is then used as the starting value for a CRC generation process. The part of the data block of the candidate block under the L6 format that extends forward from position L3 and which was decoded during the TB3 trace back operation is now applied to the retrieved CRC value for position L3 in a CRC generation process as indicated by arrow E3. As shown, arrow E3 ends at position L5, corresponding to the end of the data block of the candidate block under the L6 format, The final CRC value produced at the end of the CRC generation process is then compared with the CRC contained in the candidate block, decoded from the soft decisions in the portion of the signal lying between points L6 and L5. If these two CRC values coincide, then the L6 format is considered to pass the CRC test.

If the L6 candidate format passes both the metric test and the CRC test, then the L6 transport format is recorded as the true transport format in the transport format indication 24.

In the operation of the FIG. 3 system as described above, the position L1 determines the CRC value that is stored during CRC generation process E1 and also the end point of trace back process TB2 and the start point of CRC generation process E2. Similarly, position L3 determines the CRC value that is stored during CRC generation process E2 and also sets the end point of the trace back process TB3 and the start point of the CRC generation process E3. The position of point L1 relative to the end of the shortest candidate block at L2 and the position of L3 relative to the end of the intermediate length candidate block at L4 are chosen such that process TB3 overlaps process TB2 which in turn overlaps TB1. The purpose of these overlaps is to ensure that there is sufficient confidence in the decoded information obtained by the trace back operations. For example, the overlap between TB2 and TB1 eliminates in CRC generation process E2 the effect of the trace back data generated during the part of process TB1 extending from point L2 to point L1. The purpose of excluding this data from the CRC generation process is to avoid using the least accurate part of the information provided by operation TB 1.

The advantages of the FIG. 3 arrangement over the FIG. 2 embodiment are that, with the exception of the overlaps between the trace back operations, there is no need to perform multiple trace back operations over the same data thus saving processing time. Moreover, the size of the decision history can now be reduced since there is no longer any need to perform a trace back over a decision history corresponding to the entire length of the largest possible candidate block. For example, in the situation shown in FIG. 4, the decision history no longer needs to accommodate a trace back from L6 to L0 but only needs to be large enough to accommodate whichever of the three trace back processes TB1, TB2, TB3 is the largest.

The invention claimed is:

1. A method of assessing an encoded signal to locate a format in a plurality of candidate formats that was likely used to arrange the signal into blocks before the encoding was done, the method comprising:

performing a test on candidate formats in turn but refraining from testing further candidate formats once a candidate format passes the test, wherein the test determines whether or not a candidate format is likely to be the format used on the signal and the test, for a given candidate format, comprises:

using a Viterbi algorithm to determine trellis metrics for a point in said signal that would be an end point of a candidate block according to the given candidate format;

determining from said metrics the likelihood of occupation at said point of an end state of an encoding scheme used to create the encoded signal;

decoding a part of said signal ending at said point; and performing a check using said decoded part to determine whether the candidate block satisfies an error protection scheme of the given candidate format.

2. A method according to claim 1, wherein the step of determining the likelihood of occupation of the end state comprises comparing the metrics at the end point.

3. A method according to claim 2, wherein the step of determining the likelihood of occupation of the end state comprises comparing the maximum metric at the end point with the end state metric at the end point.

4. A method according to claim 1, wherein the likelihood of occupation obtained from said metrics is used to determine whether said checking step is to be performed.

5. A method according to claim 1, wherein the likelihood of occupation obtained from said metrics is used to determine whether said decoding step is to be performed.

6. A method according to claim 1, wherein the given candidate format specifies that the candidate block has a data part and a checksum part and the checking step comprises generating a corroborative checksum from a part of the candidate block that would be data according to the given candidate format and comparing the corroborative checksum with the said checksum part.

7. A method according to claim 6, wherein said decoded part contains said data part of the candidate block.

8. A method according to claim 6, wherein said decoded part contains a section only of said data part of the candidate block and the corroborative checksum is generated from said section using an intermediate checksum value as a starting point.

9. Apparatus for assessing an encoded signal to locate a format in a plurality of candidate formats that was likely used to arrange the signal into blocks before the encoding was done, the apparatus comprising:

a tester for performing a test on candidate formats in turn and for refraining from testing further candidate formats once a candidate format passes the test, wherein the test determines whether or not a candidate format is likely to be the format used on the signal and the tester comprises:

a calculator for applying a Viterbi algorithm to determine trellis metrics for a point in said signal that would be an end point of a candidate block according to a given candidate format;

an assessor for determining from said metrics the likelihood of occupation at said point of an end state of an encoding scheme used to create the encoded signal;

a decoder for decoding a part of said signal ending at said point; and a checker for performing a check using said decoded part to determine whether the candidate block satisfies an error protection scheme of the given candidate format.

10. Apparatus according to claim 9, wherein the assessor determines the likelihood of occupation of the end state by comparing metrics at the end point.

11. Apparatus according to claim 10, wherein the assessor determines the likelihood of occupation of the end state by comparing the maximum metric at the end point with the end state metric at the end point.

12. Apparatus according to claim 9, wherein the likelihood of occupation obtained from said metrics is used to determine whether said check is to be performed.

13. Apparatus according to claim 9, wherein the likelihood of occupation obtained from said metrics is used to determine whether the decoding is to be performed by the decoder.

14. Apparatus according to claim 9, wherein the given candidate format specifies that the candidate block has a data part and a checksum part and the checker generates a corroborative checksum from a part of the candidate block that would be data according to the given candidate format and compare the corroborative checksum with said checksum part.

15. Apparatus according to claim 14, wherein said decoded part contains said data part of the candidate block.

16. Apparatus according to claim 14, wherein said decoded part contains a section only of said data part of the candidate block and the checker generates the corroborative checksum from said section using an intermediate checksum value as a starting point.

17. A computer readable storage medium having program code when executed by a processor causes a data processing apparatus to perform a method of assessing an encoded signal to locate a format in a plurality of candidate formats that was likely used to arrange the signal into blocks before the encoding was done, the program code when executed causes the data processing apparatus to perform a test on candidate formats in turn but refrain from testing further candidate formats once a candidate format passes the test, wherein the test determines whether or not a candidate format is likely to be the format used on the signal and the test, for a given candidate format, the program code when executed further causing the data processing apparatus to perform the steps of:
   using a Viterbi algorithm to determine trellis metrics for a point in said signal that would be an end point of a candidate block according to the given candidate format;
   determining from said metrics the likelihood of occupation at said point of an end state of an encoding scheme used to create the encoded signal;
   decoding a part of said signal ending at said point; and
   performing a check using said decoded part to determine whether the candidate block satisfies an error protection scheme of the given candidate format.

* * * * *